(12) United States Patent
Kajino et al.

(10) Patent No.: US 11,410,077 B2
(45) Date of Patent: Aug. 9, 2022

(54) IMPLEMENTING A COMPUTER SYSTEM TASK INVOLVING NONSTATIONARY STREAMING TIME-SERIES DATA BY REMOVING BIASED GRADIENTS FROM MEMORY

(71) Applicant: INTERNATIONAL BUSINESS MACHINES CORPORATION, Armonk, NY (US)

(72) Inventors: Hiroshi Kajino, Tokyo (JP); Kohei Miyaguchi, Kanagawa (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 857 days.

(21) Appl. No.: 16/268,040

(22) Filed: Feb. 5, 2019

(65) Prior Publication Data
US 2020/0250572 A1 Aug. 6, 2020

(51) Int. Cl.
*G06N 20/00* (2019.01)
*G06F 17/17* (2006.01)

(52) U.S. Cl.
CPC ............. *G06N 20/00* (2019.01); *G06F 17/17* (2013.01)

(58) Field of Classification Search
CPC ........ G06N 20/00; G06N 3/084; G06F 17/17; G06F 17/11; G01R 23/167; G01R 23/18
See application file for complete search history.

(56) References Cited

U.S. PATENT DOCUMENTS 8,631,040 B2 * 1/2014 Jackson .............. G06F 16/2445
707/791
11,126,660 B1 * 9/2021 Sen ....................... G06N 3/0445
(Continued)

FOREIGN PATENT DOCUMENTS

| CN | 107102969 A | 8/2017 |
|---|---|---|
| CN | 107194469 A | 9/2017 |
| CN | 107977748 A | 12/2017 |

OTHER PUBLICATIONS

Wang et al., "Giant: Globally improved approximate newton method for distributed optimization", arXiv preprint arXiv:1709.03528. Sep. 11, 2017, pp. 1-21.

(Continued)

*Primary Examiner* — Jonathan Han
(74) *Attorney, Agent, or Firm* — Tutunjian & Bitetto, P.C.; Randall Bluestone

(57) ABSTRACT

A computer-implemented method for implementing a computer system task involving streaming data by removing biased gradients from memory includes generating a parameter sequence including a plurality of parameters corresponding to respective iteration counts. Generating the parameter sequence includes obtaining a first parameter value corresponding to a given iteration count by updating memory corresponding to the given iteration count based on a second parameter value corresponding to a prior iteration count, adapting a size of the updated memory to remove biased gradients, and obtaining the first parameter value by performing a step of a gradient descent method based on the adaptation and the second parameter value. The method further includes learning a time-series model based on the parameter sequence, and implementing a computer system task using the time-series model.

20 Claims, 6 Drawing Sheets

(56) References Cited

U.S. PATENT DOCUMENTS

| | | | |
|---|---|---|---|
| 2016/0299938 A1 | 10/2016 | Malhotra et al. | |
| 2017/0227584 A1* | 8/2017 | Suehiro | G01R 23/167 |
| 2018/0150036 A1* | 5/2018 | Xu | G05B 13/041 |

OTHER PUBLICATIONS

Hill et al., "Anomaly detection in streaming environmental sensor data: A data-driven modeling approach", Environmental Modelling & Software Sep. 1, 2010;25(9):1014-22.

Office Action in corresponding U.S. Appl. No. 16/268,071 dated Nov. 1, 2021, pp. 1-61.

U.S. Final Office Action issued in U.S. Appl. No. 16/268,071 dated Jul. 7, 2021, pp. 1-48.

Bifet et al., Learning from Time-Changing Data with Adaptive Windowing, SIAM International Conference on Data Mining (SDM'07), 2007, pp. 1-6, Minneapolis, Minnesota.

Mandt et al., Smoothed Gradients for Stochastic Variational Inference, Neural Information Processing Systems, Neural Information Processing Systems (arXiv:1406.3650), Nov. 18, 2014, pp. 1-9.

Schaul et al., No More Pesky Learning Rates, Proceedings of the 30th International Conference on Machine Learning (arXiv:1206.1106), 2013, pp. 343-351, vol. 28.

Wu et al., WNGrad: Learn the Learning Rate in Gradient Descent, arXiv:1803.02865v1 [stat.ML], Mar. 7, 2018, pp. 1-16.

Balles et al., "Dissecting Adam: The Sign, Magnitude and Variance of Stochastic Gradients", International Conference on Machine Learning. PMLR, Jun. 2018, pp. 1-10.

Kingma et al., "Adam: A method for stochastic optimization" (arXiv preprint arXic:1412.6980), May 2015, pp. 1-15.

Read, Jesse, "Concept-drifting Data Streams are Time Series; The Case for Continuous Adaptation" (arXiv preprint arXic: 1810.02266), Oct. 2018, pp. 1-15.

Office Action in corresponding U.S. Appl. No. 16/268,071 dated Apr. 2, 2021, pp. 1-46.

Zhang et al, MedMon: Securing Medical Devices Through Wireless Monitoring and Anomaly Detection, IEEE Transactions on Biomedical Circuits and Systems, Dec. 2013, pp. 871-881, vol. 7, No. 6, IEEE.

Office Action in related U.S. Appl. No. 16/268,071 dated Apr. 12, 2022, pp. 1-72.

\* cited by examiner

IMPLEMENTING A COMPUTER SYSTEM TASK INVOLVING NONSTATIONARY STREAMING TIME-SERIES DATA BY REMOVING BIASED GRADIENTS FROM MEMORY

BACKGROUND

Technical Field

The present invention generally relates to artificial intelligence and machine learning, and more particularly to implementing a computer system task involving nonstationary streaming time-series data by removing biased gradients from memory.

Description of the Related Art

Machine learning models can be trained using one or more methods for optimizing objective functions (e.g., cost or loss functions). Such objective functions can be used to measure how well a machine learning model is performing by, e.g., assigning a cost to model errors associated with current parameter values. Objective function optimization methods can be used to train a wide range of models for implementing machine learning tasks, including but not limited to support vector machines, logistic regression and graphical models. In combination with a backpropagation algorithm, objective function optimization methods can be used to train neural networks for implementing machine learning tasks.

SUMMARY

In accordance with an embodiment of the present invention, a system for implementing a computer system task involving nonstationary streaming time-series data by removing biased gradients from memory is provided. The system includes a memory device for storing program code and at least one processor device operatively coupled to the memory device. The at least one processor device is configured to execute program code stored on the memory device to generate a parameter sequence including a plurality of parameters corresponding to respective iteration counts. The at least one processor device is configured to obtain a first parameter value corresponding to a given iteration count by updating memory corresponding to the given iteration count based on a second parameter value corresponding to a prior iteration count, adapting a size of the updated memory to remove biased gradients, and obtaining the first parameter value by performing a step of a gradient descent method based on the adaptation and the second parameter value. The at least one processor device is further configured to execute program code stored on the memory device to learn a time-series model based on the parameter sequence, and implement the machine learning task using the time-series model.

In accordance with another embodiment of the present invention, a computer-implemented method for implementing a computer system task involving nonstationary streaming time-series data by removing biased gradients from memory is provided. The method includes generating a parameter sequence including a plurality of parameters corresponding to respective iteration counts. Generating the parameter sequence includes obtaining a first parameter value corresponding to a given iteration count by updating memory corresponding to the given iteration count based on a second parameter value corresponding to a prior iteration count, adapting a size of the updated memory to remove biased gradients, and obtaining the first parameter value by performing a step of a gradient descent method based on the adaptation and the second parameter value. The method further includes learning a time-series model based on the parameter sequence, and implementing a computer system task using the time-series model.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

The embodiments described herein can implement a computer system task involving nonstationary streaming time-series data by learning a time-series model in an online manner. A stationary time-series is a time-series with statistical properties (e.g., mean variance, autocorrelation) being constant over time, whereas a nonstationary time-series is defined as a time-series that is not stationary. For example, the embodiments described herein can apply a gradient descent method such as, e.g., stochastic gradient descent, that can handle nonstationary streaming time-series data to build and train a machine learning model. Gradient descent methods can find optimal parameters corresponding to optimal model performance by minimizing a corresponding objective function (e.g., cost or loss function) based on iteratively adjusting the parameters. The embodiments described herein can automatically tune a learning rate of the gradient descent method in a manner that reduces or eliminates biases in estimates of curvature and moments that can persist in memory, thereby increasing the speed that a processing device can automatically tune the learning rate for building and training a machine learning model. Accordingly, the embodiments described herein can improve the ability of a processing device to build and learn models for implementing computer system tasks (e.g., machine learning tasks) involving nonstationary streaming time-series.

Figure 1:
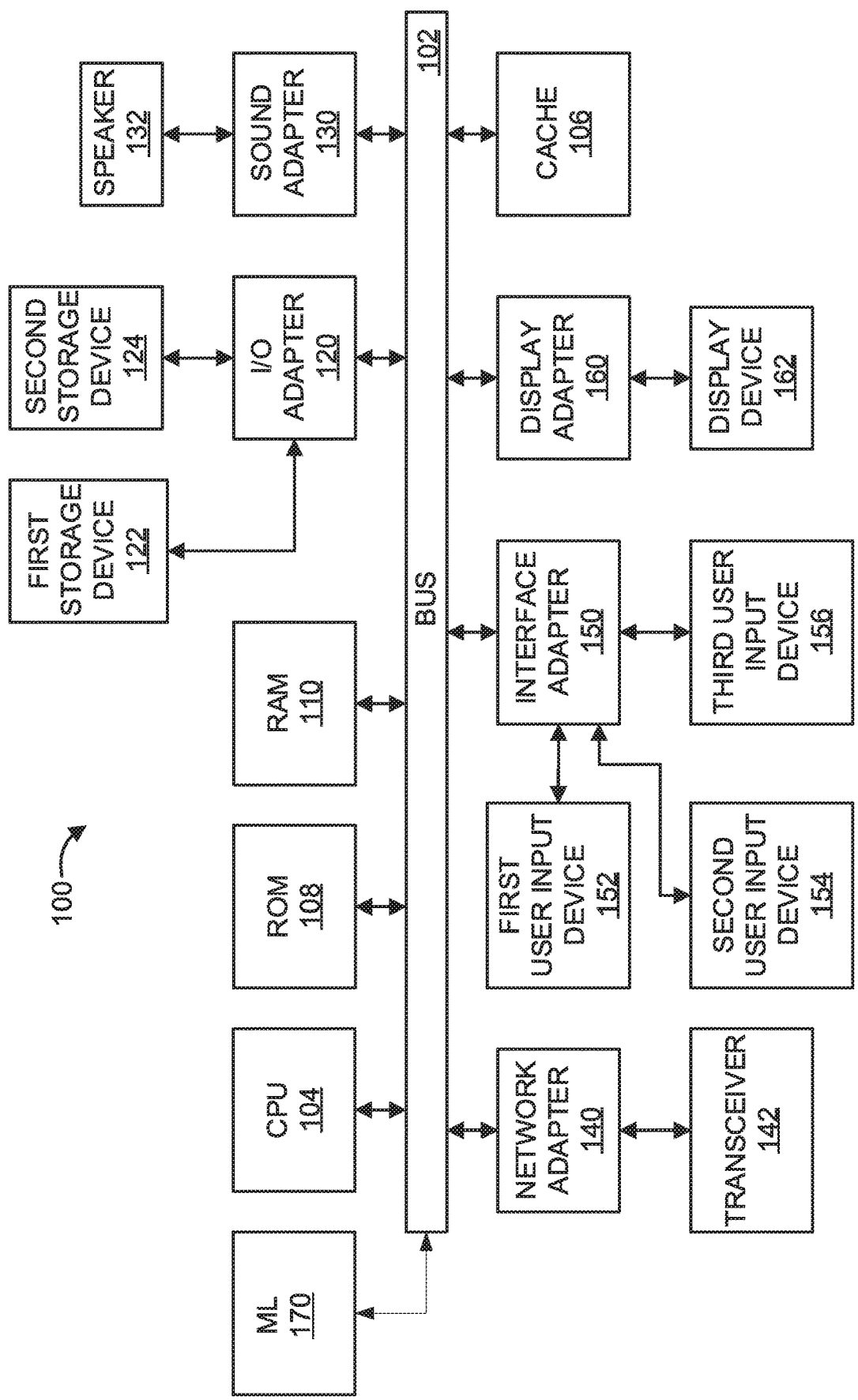
FIG. 1 is a block diagram of a processing system, in accordance with an embodiment of the present invention.

Referring now to the drawings in which like numerals represent the same or similar elements and initially to FIG. 1, an exemplary processing system 100 to which the present invention may be applied is shown in accordance with one embodiment. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 100.

Model learning (ML) component 170 may be operatively coupled to system bus 102. ML component 170 is configured to learn a time-series model for implementing a computer system task (e.g., anomaly detection task) as described in further detail below. ML component 170 can be implemented as a standalone special purpose hardware device, or may be implemented as software stored on a storage device. In the embodiment in which ML component 170 is software-implemented, although shown as a separate component of the computer system 100, ML component 170 can be stored on, e.g., the first storage device 122 and/or the second storage device 124. Alternatively, ML component 170 can be stored on a separate storage device (not shown).

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present invention provided herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 2:
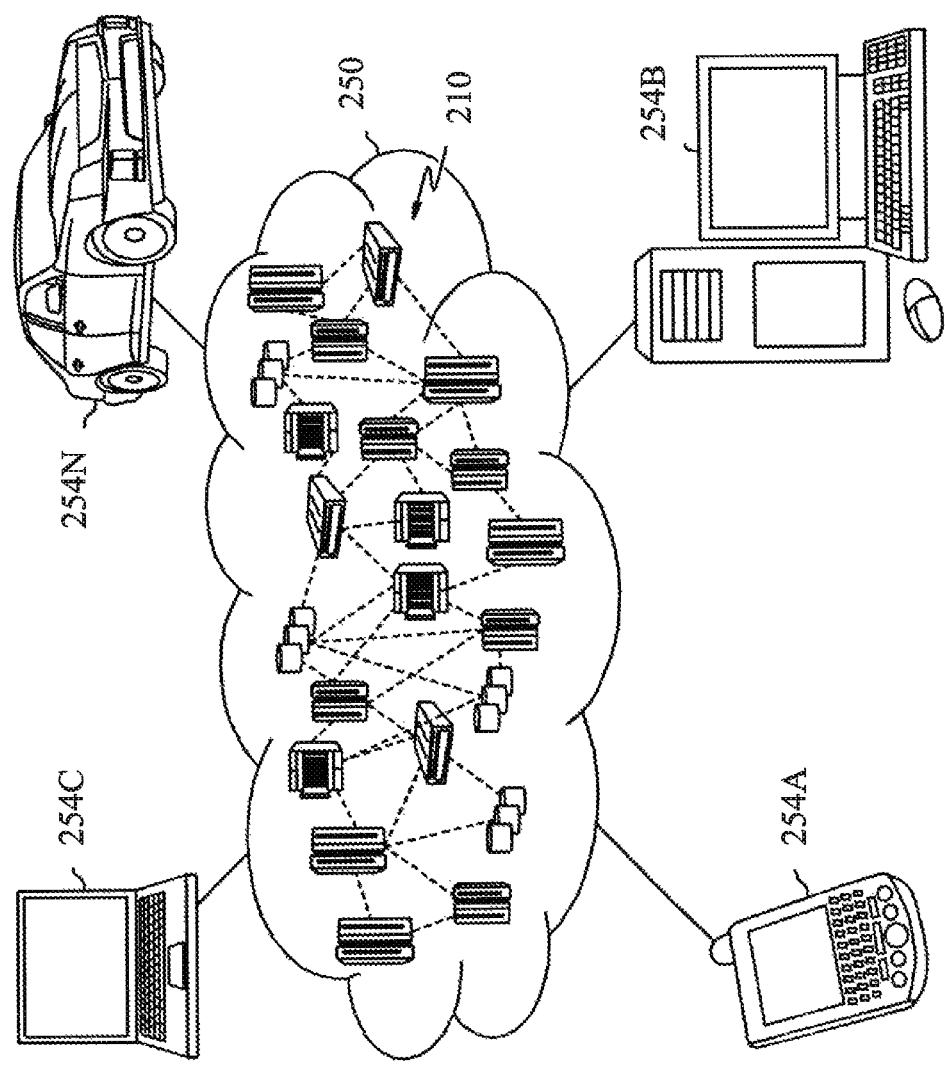
FIG. 2 is a block diagram of an illustrative cloud computing environment having one or more cloud computing nodes with which local computing devices used by cloud consumers communicate, in accordance with an embodiment of the present invention.

Referring now to FIG. 2, illustrative cloud computing environment 250 is depicted. As shown, cloud computing environment 250 includes one or more cloud computing nodes 210 with which local computing devices used by cloud consumers, such as, for example, personal digital assistant (PDA) or cellular telephone 254A, desktop computer 254B, laptop computer 254C, and/or automobile computer system 254N may communicate. Nodes 210 may communicate with one another. They may be grouped (not shown) physically or virtually, in one or more networks, such as Private, Community, Public, or Hybrid clouds as described hereinabove, or a combination thereof. This allows cloud computing environment 150 to offer infrastructure, platforms and/or software as services for which a cloud consumer does not need to maintain resources on a local computing device. It is understood that the types of computing devices 254A-N shown in FIG. 2 are intended to be illustrative only and that computing nodes 210 and cloud computing environment 250 can communicate with any type of computerized device over any type of network and/or network addressable connection (e.g., using a web browser).

Figure 3:
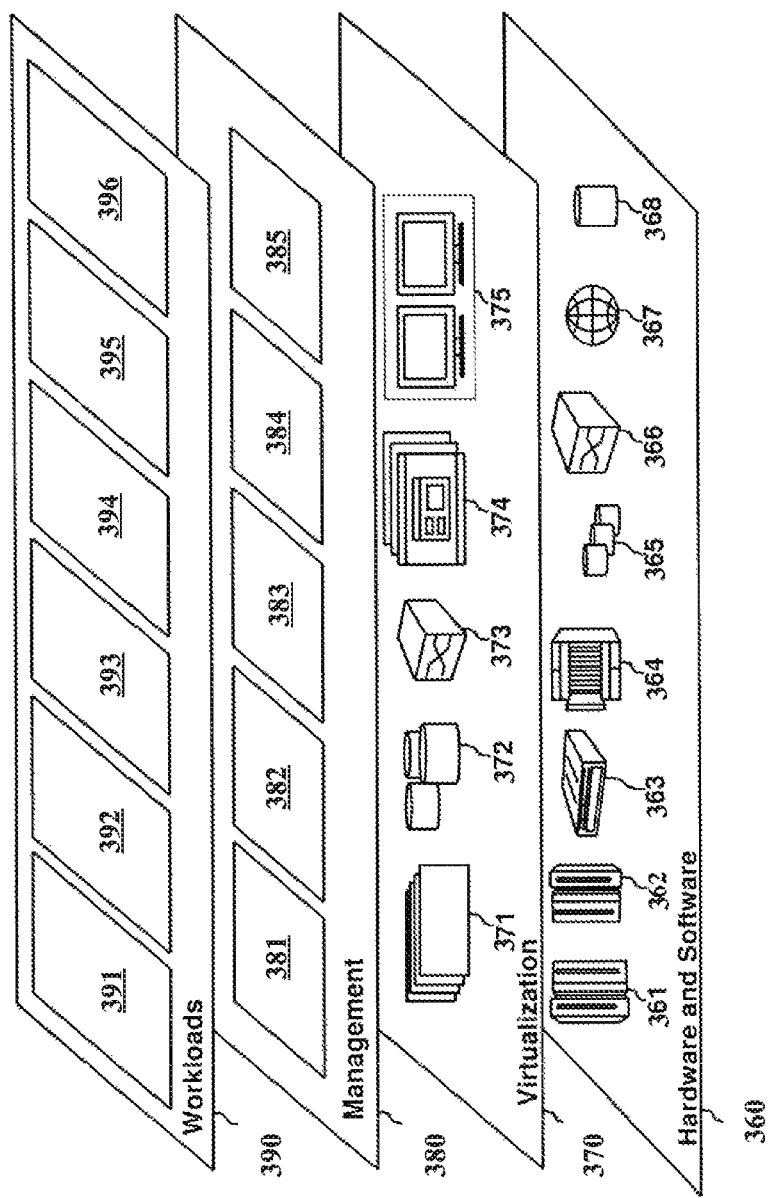
FIG. 3 is a block diagram of a set of functional abstraction layers provided by a cloud computing environment, in accordance with an embodiment of the present invention.

Referring now to FIG. 3, a set of functional abstraction layers provided by cloud computing environment 250 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 360 includes hardware and software components. Examples of hardware components include: mainframes 361; RISC (Reduced Instruction Set Computer) architecture based servers 362; servers 363; blade servers 364; storage devices 365; and networks and networking components 366. In some embodiments, software components include network application server software 367 and database software 368.

Virtualization layer 370 provides an abstraction layer from which the following examples of virtual entities may be provided: virtual servers 371; virtual storage 372; virtual networks 373, including virtual private networks; virtual applications and operating systems 374; and virtual clients 375.

In one example, management layer 380 may provide the functions described below. Resource provisioning 381 provides dynamic procurement of computing resources and other resources that are utilized to perform tasks within the cloud computing environment. Metering and Pricing 382 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 383 provides access to the cloud computing environment for consumers and system administrators. Service level management 384 provides cloud computing resource allocation and management such that required service levels are met. Service Level Agreement (SLA) planning and fulfillment 385 provide pre-arrangement for, and procurement of, cloud computing resources for which a future requirement is anticipated in accordance with an SLA.

Workloads layer 390 provides examples of functionality for which the cloud computing environment may be utilized. Examples of workloads and functions which may be provided from this layer include: mapping and navigation 391; software development and lifecycle management 392; virtual classroom education delivery 393; data analytics processing 394; transaction processing 395; and telematics data processing 396.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Figure 4:
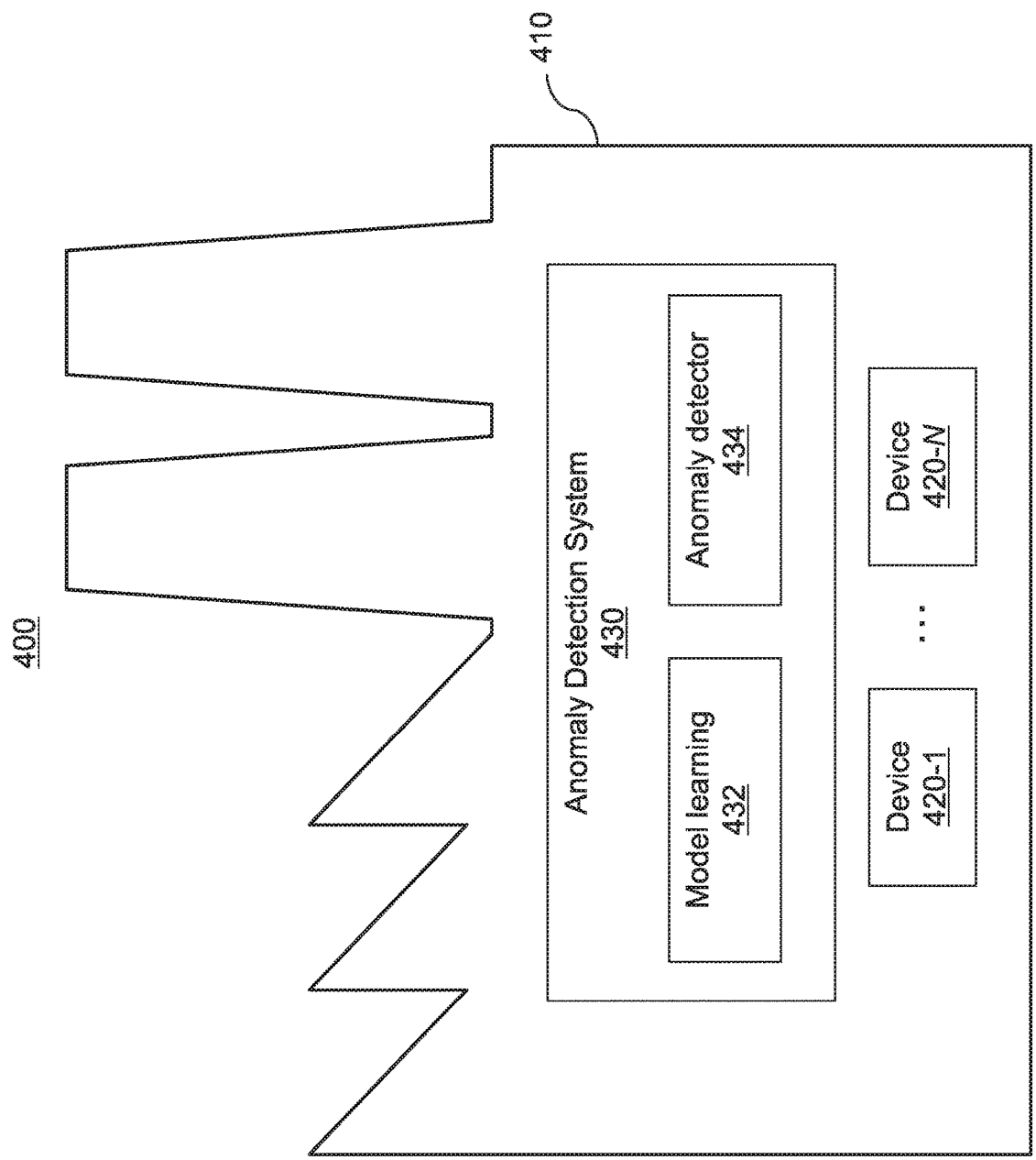
FIG. 4 is a block diagram of a system implementing a task involving nonstationary streaming time-series data, in accordance with an embodiment of the present invention.

With reference to FIG. 4, a diagram is provided illustrating an exemplary system architecture 400. In the illustrative embodiment depicted in FIG. 4, the system architecture 400 is shown being based within a factory 410 including a plurality of devices 420-1 through 420-N. In one embodiment, the system 400 includes an Internet of Things (IoT)

system and the plurality of devices 420-1 through 420-N include a plurality of IoT sensor devices. In this illustrative embodiment, the system architecture 400 can implement an industrial IoT system including IoT sensor devices for monitoring the status of industrial machines within the factory 410. That is, the factory 410 can be implemented as a "smart" factory.

Although the system architecture 400 is shown being implemented within the context of a factory 410, the system architecture 400 can be implemented within any suitable context. Examples of other contexts, but are not limited to, consumer applications (e.g., "smart home" systems including smart home objects providing home automation), and commercial applications (e.g., "smart healthcare" systems including smart medical objects providing remote health monitoring).

As shown, the system architecture 400 further includes an anomaly detection system 430 for performing an anomaly detection task within the factory 410. In performing this task, a statistical model can be used to learn patterns of sensor inputs from the devices 420-1 through 420-N. Such a model can be applied to check whether upcoming sensor inputs are predictable or not and, if the upcoming sensor inputs are not predictable, an anomaly is detected.

For example, the anomaly detection system 430 can include a model learning component 432 for learning a machine learning model for detecting anomalies, and an anomaly detector 434 for performing an anomaly detection task by applying the learned machine learning model to sensor inputs. The anomaly detector 434 can be further configured to automatically generate an alert when an anomaly is detected based on the machine learning model.

If the sensor inputs are non-stationary, it can be difficult to implement the anomaly detection system 430 due at least in part to the inability to track changes and reliance on tuning using expert knowledge. As will be further described in detail below with reference to FIGS. 5-7, the model learning component 432 can learn a time-series model involving nonstationary streaming time-series data. By doing this, the model learning component 432 can automatically track changes in data distributions without human intervention vis-à-vis expert knowledge, thereby improving the ability of the computing device to perform anomaly detection.

Figure 5:
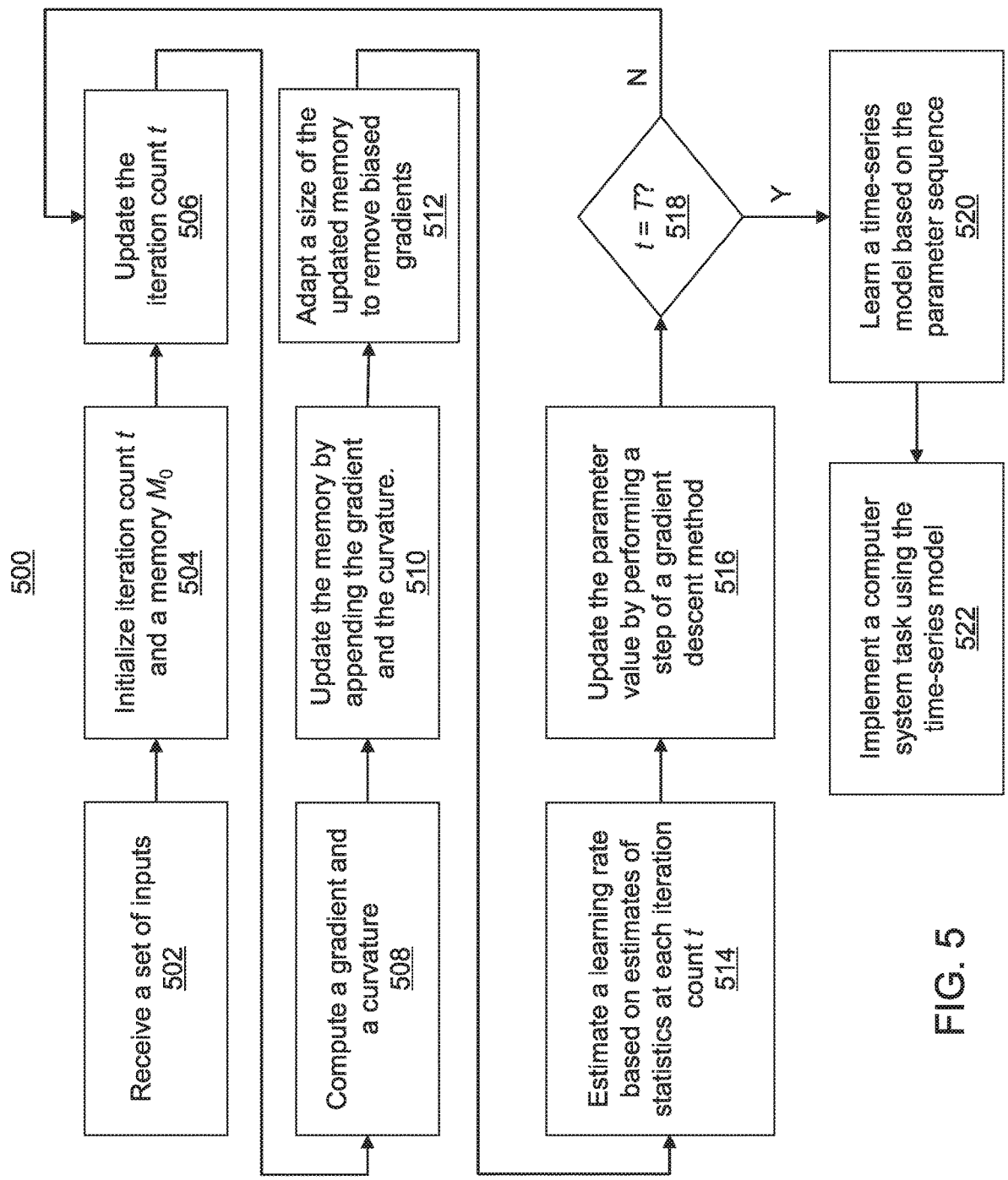
FIG. 5 is a block/flow diagram of a system/method for implementing a computer system task involving nonstationary streaming time-series data, in accordance with an embodiment of the present invention.

With reference to FIG. 5, a block/flow diagram is provided illustrating a system/method 500 for implementing a computer system task involving nonstationary streaming time-series data. For example, the computer system task can include learning a time-series model in an online manner. The time-series model can be used to perform anomaly detection (e.g., to detect anomalies based on sensor inputs of an IoT system), as described above with reference to FIG. 4.

Illustratively, the computer system task can include learning a time-series model, $p_\theta(X^{t+1}|x^t)$, where $\theta$ is a parameter, $x^t = x_1, x_2, \ldots, x_t$ is a set of past observations, and once it is observed that $X_{t+1} = x_{t+1}$, the parameter $\theta$ is updated. More specifically, the system/method 500 can be used to learn a series of model parameters $\theta^*_t$, such that:

$$\theta^*_t = \underset{\theta \in \Theta}{\arg\min} \mathcal{L}_t(\theta) \quad (1)$$

where $\mathcal{L}_t(\theta) \overset{def}{=} \mathbb{E}_{X_t}[\ell(\theta; X_t) | x^{t-1}]$, $\ell(\theta; X_t) \overset{def}{=} -\log p_\theta(X_t | x^{t-1})$, so as to adapt to the changing environment, since the optimal parameter can change in the nonstationary environment. In equation (1), $\ell(\theta; X_t)$ refers to an objective function, $\mathbb{E}$ refers to the expectation, and $\mathcal{L}_t(\theta)$ refers to the true objective function.

Generally, an objective function is a function that is optimized during training during a machine learning task. In one embodiment, the series of objective functions includes a series of loss or cost functions.

As will be described in further detail below, the system/method 500 can solve the optimization above (e.g., by approximation), because the past observations are represented as a series of realizations $x^t = x_1, x_2, \ldots, x_t$ and the true objective function $\mathcal{L}_t(\theta)$ is not available (the true objective function cannot be calculated without the true distribution $p_\theta(X_{t+1}|x^t)$, which we wish to learn). The objective function can be minimized by $\theta_t = \theta_{t-1} - \eta^*_t \nabla \ell_t(\theta_{t-1})$ using, e.g., stochastic gradient descent with an optimal learning rate $$\eta^*_t = \frac{\bar{g}_t^2}{\bar{h}_t \bar{v}_t}, \text{ where } g_t = \nabla \ell_t(\theta_{t-1}), v_t = (\nabla \ell_t(\theta_{t-1}))^2,$$

and $h_t = \nabla^2 \ell_t(\theta_{t-1})$, and $\bar{g}_t, \bar{v}_t,$ and $\bar{h}_t$ are expectations with respect to the true probability distribution $p_\theta(X_{t+1}|x^t)$. Since the statistics $\bar{g}_t, \bar{v}_t,$ and $\bar{h}_t$ are computed with the knowledge of the true probability distribution $p_\theta(X_{t+1}|x^t)$, we construct estimators of them, including $\hat{g}_t, \hat{v}_t,$ and $\hat{h}_t$, and substitute the estimators for the statistics in the optimal learning rate to compute $\eta^*_t$ approximately. The memory unit described below can be used to compute the estimators.

At block 502, a set of inputs is received. The set of inputs can include a series of objective functions $\ell_t$ and an initial parameter value $\theta_0$.

At block 504, the iteration count or time step t and a memory $M_0$ are initialized. For example, $t \leftarrow 0$; $M_0 \leftarrow 0$. The final iteration can be represented by the variable T. The value of T could be infinity in the event that input data has no end.

At block 506, the iteration count t is updated (e.g., $t \leftarrow t+1$).

At block 508, a gradient $g_t$ and curvature $h_t$ of the objective function $\ell_t$ are computed. The gradient $g_t$ and curvature $h_t$ can be computed based on the parameter value. For example, $g_t \leftarrow \nabla \ell_t(\theta_{t-1})$; $h_t \leftarrow \nabla^2 \ell_t(\theta_{t-1})$.

At block 510, the memory is updated by appending the gradient and the curvature. For example, $M_t \leftarrow M_{t-1} \cup \{(g_t, h_t)\}$. The updated memory $M_t$ can include a plurality of partitions p.

At block 512, a size of the updated memory is adapted to remove biased gradients. In one embodiment, a memory unit is equipped with a bias removing component for performing the memory size adaptation, as will be described in further detail below with reference to FIG. 6.

For example, the updated memory can be shrunk by dropping the last element. The memory size adaptation removes biased, irrelevant gradients from the updated memory in order to correctly estimate a learning rate (e.g., an optimal learning rate). The shrinking of the updated memory can be repeated until the null hypothesis "there is no change in $M_t$" is accepted. Accordingly, the adaptation involves change point detection under an assumption of piecewise stationarity of the time-series.

At block 514, a learning rate $\eta_t$ is estimated based on estimators of statistics at each iteration count t. At each iteration count t, the estimators can be defined as the sample means of the examples in the memory unit. The learning rate determines how "fast" or "slow" the gradient descent method moves toward the solution. For the gradient descent method to reach the minimum of the objective function, the learning rate needs to be set to an appropriate value. For example, if the learning rate is set too high, the steps the gradient descent can bounce around and not reach the minimum, and if the learning rate is set too low, it may take too much time and resources to reach the minimum.

For example, the learning rate can be defined as $$\eta_t = \frac{\hat{g}_t^2}{\hat{h}_t \hat{v}_t},$$

where $\hat{g}_t$, $\hat{v}_t$, and $\hat{h}_t$ are estimators that are computed using the examples in the memory $M_t$. As mentioned above, the estimators $\hat{g}_t$, $\hat{v}_t$, and $\hat{h}_t$ can be substituted for the statistics in the optimal learning rate to compute the optimal learning rate as $$\eta_t^* = \frac{\bar{g}_t^2}{\bar{h}_t \bar{v}_t},$$

where $\bar{g}_t$, $\bar{v}_t$, and $\bar{h}_t$ are expectations with respect to the true probability distribution $p_\theta(X_{t+1}|x^t)$.

By adjusting the size of the memory $M_t$ at block 512, the system/method 500 can adapt to changes in the environment. Accordingly, the memory size adaptation performed at block 512 can improve the ability of a processing device to estimate the learning rate at block 514, thereby improving the ability of a processing device to implement a machine learning task involving optimizing a model based on the learning rate (e.g., model and/or neural network training).

Further details regarding blocks 512-514 will now be described with reference to FIG. 6.

Figure 6:
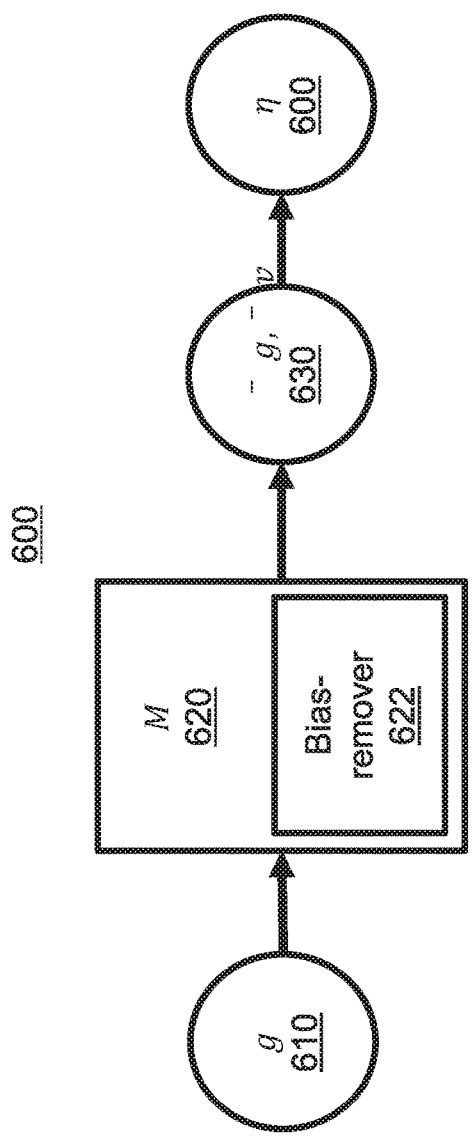
FIG. 6 is a block/flow diagram of a system for adapting memory size and estimating a learning rate based on the adaptation, in accordance with an embodiment of the present invention.

With reference to FIG. 6, a block/flow diagram is provided illustrating a system 600 for adapting memory size and estimating a learning rate based on the adaptation.

As shown, a gradient 610 is provided to memory unit 620. The memory unit 620 memorizes all relevant gradients for estimator unit 630, and the estimator unit 630 can generate an estimated learning rate 640. More specifically, the memory unit 620 can include a bias remover 622 configured to adapt a size of the memory unit 620 by removing biased gradients so that the memory unit 620 contains only unbiased gradients. Although the bias remover 622 is shown embedded within the memory unit 620, the bias remover 622 can be a separate component of the system 600, or located within another component of the system 600 (e.g., the estimator unit 630). Furthermore, although the memory unit 620 and the estimator unit 630 are shown as separate components of the system 600, the memory unit 620 and the estimator unit 630 can alternatively be combined within a single component of the system 600.

In one embodiment, adapting the size of the memory unit 620 includes determining if there is significant change in the expectation of $\nabla \ell_t$, denoted as $\mathbb{E} \nabla \ell_t$. If there is significant change in $\mathbb{E} \nabla \ell_t$, gradients before that are irrelevant. It can be determined if there is a change between first and second moments of gradient. If a change is detected, the updated memory is shrunk by dropping the last gradient. This test is repeated until it is accepted for all partitions p. The estimators of the statistics $\hat{g}_t$, $\hat{v}_t$, and $\hat{h}_t$ can then be computed based on a size of the memory unit 720. An illustrative example of how the size of the memory unit 620 can be adapted will now be described below with reference to FIG. 7.

Figure 7:
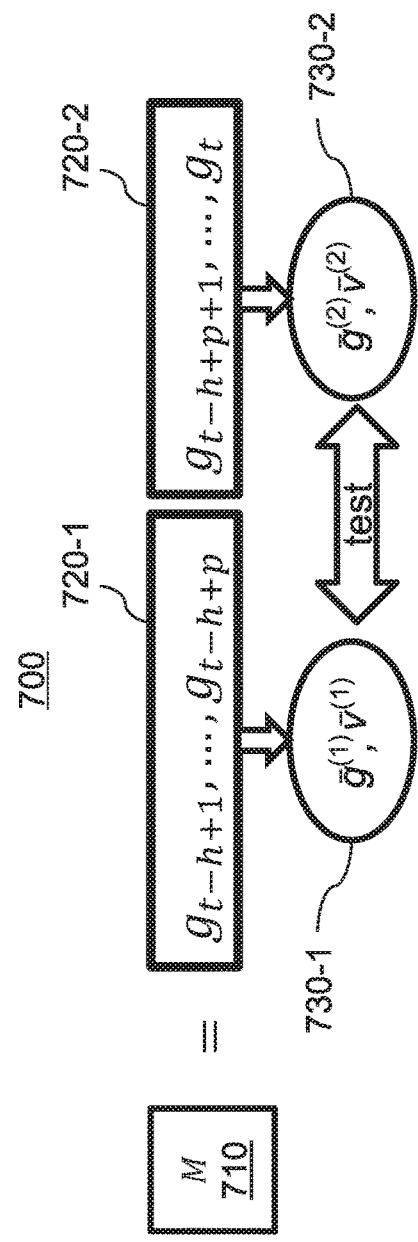
FIG. 7 is a diagram of testing performed during the adaptation of memory size, in accordance with an embodiment of the present invention.

With reference to FIG. 7, a diagram 700 is provided illustrating an illustrative example of how the size of a memory unit 710 can include a first subset of gradients 720-1 and a second subset of gradients 720-2. The first subset 720-1 can be represented by $g_{t-h+1}, \ldots, g_{t-h+p}$ and the second subset 720-2 can be represented by $g_{t-h+p+1}, \ldots, g_t$, where t is the current iteration count, h is the current size of the memory unit 710, and p is an arbitrary integer of the set $\{1, 2, \ldots, h-1\}$. The gradients of the first subset 720-1 can be used to determine a first set of gradient data 730-1 including an average of the gradients of the first subset, $\bar{g}^{(1)}$, and an average of the moments of the gradients of the first subset, $\bar{v}^{(1)}$. Similarly, the gradients of the second subset 720-2 can be used to determine a second set of gradient data 730-2 including an average of the gradients of the second subset, $\bar{g}^{(2)}$, and an average of the moments of the gradients of the second subset, $\bar{v}^{(2)}$. The first and second sets of gradient data 730-1 and 730-2 are tested against each other to detect any change. If a change is detected, the memory unit 710 is shrunk by dropping the last gradient, and this process is repeated until the test is accepted for all $p \in \{1, 2, \ldots, h-1\}$.

In some embodiments, a t-test can be used as a hypothesis testing algorithm for testing the first and second sets of gradient data 730-1 and 730-2. For example, in one embodiment, Welch's t-test can be used, which can receive two samples and output the p-value under a null hypothesis that the means of the two samples are equal. Given a user-specified threshold on the p-value (e.g., 0.05), a change is detected if the p-value is below the threshold.

The estimators of the statistics $\hat{g}_t$, $\hat{v}_t$, and $\hat{h}_t$ can then be computed as $\hat{g}_t = \Sigma_{\tau=1}^{|M_t|} g_{t-\tau}$, $\hat{v}_t = \Sigma_{\tau=1}^{|M_t|} v_{t-\tau}$, and $\hat{h}_t = \Sigma_{\tau=1}^{|M_t|} h_{t-\tau}$, where $|M_t|$ is the size of the memory unit 710.

Referring back to FIG. 5, at block 516, the parameter value is updated by performing a step of a gradient descent method. For example, the parameter value $\theta_{t-1}$ can be updated to $\theta_t$. Generally, gradient descent is used to find parameter values that minimize the objective function by iteratively adjusting the parameter values. For example, the gradient descent method can include stochastic gradient descent, which is scalable in handling streaming data (e.g., nonstationary streaming time-series data). Using stochastic gradient descent, the parameter value $\theta_{t-1}$ can be updated to $\theta_t$ as $\theta_t \leftarrow \theta_{t-1} - \eta_t g_t$.

At block 518, it is determined if t=T. If not, the process reverts back to block 506 to update the iteration count. Otherwise, a parameter value sequence $\{\theta_t\}_{t=1}^T$ is output. In an alternative embodiment, $\theta_t$ is output for each iteration count t, regardless of whether t=T.

At block 520, a time-series model is learned in an online manner based on the parameter sequence. The time-series model can be learned in an online manner.

At block 522, a computer system task is implemented using the time-series model. In one embodiment, the computer system task can include a machine learning task. For example, as described above with reference to FIG. 4, the time-series model can be used to perform anomaly detection within a system (e.g., an IoT system). Illustratively, the time-series model can be used to detect anomalies with respect to an IoT system for monitoring industrial machinery (e.g., in a factory). For example, the time-series model can be applied to check whether upcoming sensor inputs are predictable or not and, if the upcoming sensor inputs are not predictable, an anomaly is detected.

Having described preferred embodiments of systems and methods of implementing a computer system task involving nonstationary streaming time-series data by removing biased gradients from memory (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claim.

What is claimed:

1. A system for implementing a computer system task involving nonstationary streaming time-series data by removing biased gradients from memory, comprising:
a memory device for storing program code; and
at least one processor device operatively coupled to the memory device and configured to execute program code stored on the memory device to:
generate a parameter sequence including a plurality of parameters corresponding to respective iteration counts, wherein the at least one processor device is configured to obtain a first parameter value corresponding to a given iteration count by:
updating memory corresponding to the given iteration count based on a second parameter value corresponding to a prior iteration count;
adapting, by a bias removing component of the memory device performing memory size adaptation, a size of the updated memory to remove biased gradients; and
obtaining the first parameter value by performing a step of a gradient descent method based on the adaptation and the second parameter value;
learn a time-series model based on the parameter sequence; and
implement a computer system task using the time-series model.

2. The system of claim 1, wherein the gradient descent method includes a stochastic gradient descent method.

3. The system of claim 1, wherein the at least one processor device is configured to update the memory corresponding to the given iteration count by appending a gradient of an objective function corresponding to the given iteration count computed based on the first parameter value.

4. The system of claim 3, wherein the at least one processor is further configured to update the memory corresponding to the given iteration count by appending a curvature of the objective function corresponding to the given iteration count.

5. The system of claim 3, wherein the at least one processor device is configured to obtain the first parameter value as a difference between the second parameter value and a product of a learning rate for performing the step of the gradient descent method and the gradient.

6. The system of claim 5, wherein the at least one processor device is further configured to execute program code stored on the memory device to estimate the learning rate based on the shrinking.

7. The system of claim 1, wherein the streaming data includes nonstationary streaming time-series data.

8. A computer-implemented method for implementing a computer system task involving streaming data by removing biased gradients from memory, comprising:
generating a parameter sequence including a plurality of parameters corresponding to respective iteration counts, including obtaining a first parameter value corresponding to a given iteration count by:
updating memory corresponding to the given iteration count based on a second parameter value corresponding to a prior iteration count;
adapting, by a bias removing component of a memory device performing memory size adaptation, a size of the updated memory to remove biased gradients; and
obtaining the first parameter value by performing a step of a gradient descent method based on the shrinking and the second parameter value;
learning a time-series model based on the parameter sequence; and
implementing a computer system task using the time-series model.

9. The method of claim 8, wherein the gradient descent method includes a stochastic gradient descent method.

10. The method of claim 8, wherein updating the memory corresponding to the given iteration count further includes appending a gradient of an objective function corresponding to the given iteration count computed based on the first parameter value.

11. The method of claim 10, wherein updating the memory corresponding to the given iteration count further includes appending a curvature of the objective function corresponding to the given iteration count.

12. The method of claim 10, wherein the first parameter value is obtained as a difference between the second parameter value and a product of a learning rate for performing the step of the gradient descent method and the gradient.

13. The method of claim 12, further comprising estimating the learning rate based on the shrinking.

14. The method of claim 8, wherein the streaming data includes nonstationary streaming time-series data.

15. A computer program product comprising a non-transitory computer readable storage medium having program instructions embodied therewith, the program instructions executable by a computer to cause the computer to perform a method for implementing a computer system task involving streaming data by removing biased gradients from memory, the method performed by the computer comprising:
generating a parameter sequence including a plurality of parameters corresponding to respective iteration counts, including obtaining a first parameter value corresponding to a given iteration count by:
updating memory corresponding to the given iteration count based on a second parameter value corresponding to a prior iteration count;
adapting, by a bias removing component of a memory device performing memory size adaptation, a size of the updated memory to remove biased gradients; and
obtaining the first parameter value by performing a step of a gradient descent method based on the adaptation and the second parameter value;
learning a time-series model based on the parameter sequence; and
implementing a computer system task using the time-series model.

16. The computer program product of claim 15, wherein the gradient descent method includes a stochastic gradient descent method.

17. The computer program product of claim 15, wherein:
- wherein updating the memory corresponding to the given iteration count further includes appending a gradient of an objective function corresponding to the given iteration count computed based on the first parameter value; and
- the first parameter value is obtained as a difference between the second parameter value and a product of a learning rate for performing the step of the gradient descent method and the gradient.

18. The computer program product of claim 17, wherein updating the memory corresponding to the given iteration count further includes appending a curvature of the objective function corresponding to the given iteration count.

19. The computer program product of claim 17, further comprising estimating the learning rate based on the shrinking.

20. The computer program product of claim 15, wherein the streaming data includes nonstationary streaming time-series data.

* * * * *